(12) United States Patent
Bencheikh et al.

(10) Patent No.: US 11,432,187 B2
(45) Date of Patent: Aug. 30, 2022

(54) DYNAMIC USE OF HEADER COMPRESSION IN A WIRELESS NETWORK

(71) Applicant: Charter Communications Operating, LLC, St. Louis, MO (US)

(72) Inventors: Ahmed Bencheikh, Lorton, VA (US); Venkata R. Divvi, Centennial, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 437 days.

(21) Appl. No.: 15/945,146

(22) Filed: Apr. 4, 2018

(65) Prior Publication Data

US 2019/0313281 A1    Oct. 10, 2019

(51) Int. Cl.
  *H04W 28/06*  (2009.01)
  *H04W 76/10*  (2018.01)
  (Continued)

(52) U.S. Cl.
  CPC ....... *H04W 28/06* (2013.01); *H04W 28/0231* (2013.01); *H04W 28/10* (2013.01);
  (Continued)

(58) Field of Classification Search
  CPC ..... H04W 28/06; H04W 28/02; H04W 28/00; H04W 28/0231; H04W 28/20; H04W 28/10; H04W 28/0215; H04W 28/0205; H04W 28/0226; H04W 28/0242; H04W 28/0247; H04W 28/0252; H04W 28/0257; H04W 28/0263; H04W 28/0278; H04W 28/0284; H04W 28/065; H04W 28/0804; H04W 28/085; H04W 28/0858; H04W 28/0867; H04W 28/0942; H04W 28/0958; H04W 28/0983; H04W 28/0992; H04W 76/10; H04W 88/16; H04W 88/181; H04W 36/02; H04W 72/1263; H04W 72/1268;
  (Continued)

(56) References Cited

U.S. PATENT DOCUMENTS 6,078,958 A  *  6/2000  Echeita ................. H04H 20/42
                                                                 709/226
6,754,221 B1 *  6/2004  Whitcher ............... H04L 47/10
                                                                 370/401
(Continued)

*Primary Examiner* — Jeffrey M Rutkowski
*Assistant Examiner* — Sudesh M Patidar
(74) *Attorney, Agent, or Firm* — Armis IP Law, LLC

(57) ABSTRACT

A wireless communication link between a wireless access point and a mobile communication device supports multiple data flows. Each of the data flows can be configured to convey a different type of data. Based on monitoring events/conditions such as conveyance of communications over each of the multiple data flows, a communication management resource selectively assigns data flow compression settings to each of the multiple data flows. Based on the assigned compression settings, the mobile communication device and/or wireless access point communicate packet delivery data (such as network address information) over the data flows. For example, in accordance with the generated compression settings, packet delivery data for data packets conveyed over a first data flow are compressed, while packet delivery data for data packets conveyed over a second data flow are not compressed.

27 Claims, 10 Drawing Sheets

(51) Int. Cl.
  *H04W 28/02* (2009.01)
  *H04W 28/20* (2009.01)
  *H04W 28/10* (2009.01)
  *H04W 88/16* (2009.01)
(52) U.S. Cl.
  CPC ............ *H04W 28/20* (2013.01); *H04W 76/10* (2018.02); *H04W 88/16* (2013.01)
(58) Field of Classification Search
  CPC ..... H04W 72/1273; H04W 4/18; H04W 4/50; H04W 24/02; H04W 24/04; H04W 24/10; H04L 69/04; H04L 67/2828; H04L 43/0805; H04L 43/0882; H04L 43/8876; H04L 43/0888; H04L 43/0894; H04L 43/16
  USPC .................................................. 370/235, 477
  See application file for complete search history.

(56) References Cited

U.S. PATENT DOCUMENTS

| | | | | |
|---|---|---|---|---|
| 6,850,764 | B1* | 2/2005 | Patel | H04W 4/029 455/450 |
| 2003/0028606 | A1* | 2/2003 | Koopmans | H04L 67/28 709/206 |
| 2003/0195006 | A1* | 10/2003 | Choong | H04W 88/181 455/450 |
| 2006/0120285 | A1* | 6/2006 | Pathak | H04W 4/24 370/230 |
| 2007/0115964 | A1* | 5/2007 | Srinivasan | H04L 47/10 370/389 |
| 2008/0205270 | A1* | 8/2008 | Kasheff | H04L 43/0882 370/232 |
| 2008/0253330 | A1* | 10/2008 | Bartlett | H04L 67/04 370/331 |
| 2009/0080374 | A1* | 3/2009 | Lee | H04L 47/70 370/328 |
| 2009/0207854 | A1* | 8/2009 | Blanchard | H04L 69/04 370/466 |
| 2010/0115135 | A1* | 5/2010 | Zhou | H04L 41/0681 709/247 |
| 2011/0055403 | A1* | 3/2011 | Balachandran | H04L 65/105 709/227 |
| 2011/0058530 | A1* | 3/2011 | Kim | H04W 36/0055 370/331 |
| 2012/0191805 | A1* | 7/2012 | Fee | H04N 21/222 709/217 |
| 2012/0213180 | A1* | 8/2012 | Meylan | H04W 28/22 370/329 |
| 2014/0064180 | A1* | 3/2014 | Kotecha | H04L 69/04 370/328 |
| 2014/0146874 | A1* | 5/2014 | Ju | H04N 19/10 375/240.02 |
| 2015/0063163 | A1* | 3/2015 | Mentze | H04L 45/02 370/254 |
| 2015/0124641 | A1* | 5/2015 | MacDonald | H04W 76/11 370/254 |
| 2015/0172421 | A1* | 6/2015 | Stjernholm | H04W 92/20 370/328 |
| 2016/0027145 | A1* | 1/2016 | Taylor | G09G 5/393 345/555 |
| 2016/0027399 | A1* | 1/2016 | Wilde | H04W 12/50 345/520 |
| 2016/0127490 | A1* | 5/2016 | Li | H04L 43/08 709/247 |
| 2016/0254959 | A1* | 9/2016 | Arndt | H04L 41/0816 370/235 |
| 2017/0141875 | A1* | 5/2017 | Eliaz | H04L 1/0006 |
| 2017/0366310 | A1* | 12/2017 | Verma | H04L 5/005 |
| 2018/0124639 | A1* | 5/2018 | Bathwal | H04L 69/04 |
| 2018/0242192 | A1* | 8/2018 | Zhao | H04L 69/04 |
| 2020/0058152 | A1* | 2/2020 | Zhang | G06T 15/005 |

\* cited by examiner

well?
DYNAMIC USE OF HEADER COMPRESSION IN A WIRELESS NETWORK

BACKGROUND

Conventional wireless networks sometimes implement carrier sense multiple access with collision avoidance (CSMA/CA) technology to provide different users wireless bandwidth to access a remote network such as the Internet. Such a mechanism is a listen-before-talk type of protocol. According to this protocol, if a collision occurs due to multiple devices communicating at the same time to obtain bandwidth, each of the devices must wait a random back-off time before trying to obtain bandwidth again.

After obtaining bandwidth, the wireless network supports conveyance of different types of data such as voice communications, video communications, web pages, email communications, etc.

In high-density wireless network deployments such as stadium or arena venues, the number of clients connected to a respective wireless access point will typically be very high when the venue is filled with people. In such high-density usage environments, where a high number of users share use of the same access point, any further increase in the number of subscribers per served area or wireless access point substantially impacts the quality of service and per user throughput to existing users.

Conventional packet header compression has been proposed to reduce an amount of redundant data transmitted in a wireless network between a mobile communication device and a wireless access point. Such techniques help to reduce network congestion.

BRIEF DESCRIPTION OF EMBODIMENTS

This disclosure includes the observation that wireless networks are very easily impacted by interference (such as overuse by too many users), resulting in high bit error rates and packet transmission latency. This makes it difficult to maintain bandwidth for each of multiple users, especially in areas in which a high density of users access the same wireless access point.

As discussed herein, it is useful to dynamically implement header compression over different data flows to save bandwidth and hence allow more efficient use of wireless bandwidth.

Embodiments herein provide novel ways of providing improved wireless communications to one or more mobile communication devices in a network environment.

For example, in one embodiment, an established wireless communication link supports conveyance of communications between a wireless access point and a mobile communication device. A monitor resource monitors attributes of a network and/or wireless communications conveyed between the wireless access point and the mobile communication device over the wireless communication link. The monitor resource communicates the monitored attributes (via feedback of conditions) to a communication management resource. The communication management resource (such as controller hardware) dynamically implements compression of packet delivery data in the wireless communications transmitted over different data flows of the wireless communication link depending on the monitored attributes.

In one embodiment, the communication management resource generates data flow compression settings to control compression associated with the different data flows. Compression may be applied to certain data flows but not others. Such an embodiment provides more efficient use of wireless bandwidth because the monitored attributes can be used to control whether or not to apply packet header compression.

In accordance with further embodiments, the mobile communication device is configured to monitor the attributes of wireless communications received from the wireless access point. In such an instance, the mobile communication device generates and provides feedback (of the monitored attributes) to the communication management resource. In one embodiment, the communication management resource (such as residing in a wireless access point, remote controller, or other suitable location) receives the monitored attributes (feedback) over the wireless communication link from the mobile communication device.

Note that the monitored attributes can include any suitable information. In one embodiment, the monitored attributes generated by the mobile communication device or other suitable resource include RF (Radio Frequency) parameters indicating an ability of the mobile communication device to receive wireless communications from the wireless access point to which the mobile communication device is communicatively coupled.

In accordance with still further embodiments, the packet delivery data in a respective wireless communication can be generated to include network address information to facilitate delivery of a corresponding data packet in the respective wireless communication to a remote destination in a packet delivery network to which the wireless access point is communicably coupled. For example, each respective wireless communication conveyed over the wireless communication link can include a corresponding data packet; the packet delivery data (such as header information supporting delivery) in the corresponding data packet can be generated to include, among other things, IP (Internet Protocol) network address information indicating a remote destination in which to route the corresponding data packet over a network.

In certain instances, the wireless communication link between the mobile communication device and the wireless access point can be configured to support multiple different data flows including a first data flow and a second data flow between the wireless access point and the mobile communication device. Embodiments herein include dynamically controlling compression settings associated with each of the multiple data flows as opposed to applying header compression to all data flows.

Dynamically implementing compression of packet delivery data in wireless communications depending on the monitored attributes can include: selecting the first data flow to implement compression of packet delivery data of wireless messages transmitted over the selected first data flow. In one embodiment, when implementing compression of packet delivery data in the wireless communications transmitted over the wireless communication link, the transmitting resource (such as a mobile communication device, wireless access point, etc.): i) communicates compressed packet delivery data in the wireless messages conveyed over the first data flow of the wireless communication link; and ii) communicates uncompressed packet delivery data in wireless messages conveyed over the second data flow of the wireless communication link. Thus, a first data flow can include compressed packet delivery data while a second data flow can be operated in a mode in which corresponding packet delivery data is not compressed.

Note further that the wireless communication link between the mobile communication device and the wireless access point can include any number of different data flows. Each data flow can be allocated to support conveyance of different types of data.

Further embodiments herein include communicating data flow compression control settings to one or more target device such as the wireless access point, mobile communication device, gateway resource, etc. For example, one embodiment herein includes communicating a first command (such as via data flow compression settings) from the communication management resource (or other suitable resource) over the wireless communication link from the wireless access point to the mobile communication device to initiate compression of packet delivery data embedded in first communications conveyed over the first data flow of the established wireless communication link. Such a command informs the mobile communication device to compress packet delivery data (such as header information) associated with data communicated over the first data flow.

Further embodiments herein can include communicating a command from the communication management resource (or other suitable resource) over the wireless communication link from the wireless access point to the mobile communication device to operate a specified data flow in a non-compression mode in which packet delivery data embedded in second communications conveyed over the second data flow of the established wireless communication link are not compressed. Such a command (via data flow compression settings) informs the mobile communication device not to compress packet delivery data (such as header information) associated with data communicated over the first data flow.

In one embodiment, the attributes monitored by a respective resource are selected from the group consisting of: i) a distance between the mobile communication device and the wireless access point, ii) a signal strength of mobile communication device received wireless communications from the wireless access point, iii) a signal to noise ratio of wireless communications received by the mobile communication device from the wireless access point, iv) amount of bandwidth needed to communicate the wireless communications, v) type of conveyed data in the wireless communications, vi) a bit error rate associated with conveyance of the wireless communications, vii) a location of the mobile communication device, viii) number of mobile communication devices using a wireless access point and/or bandwidth usage, ix) mobility status of the mobile communication device, etc.

Note that further embodiments herein include a mobile communication device that establishes a wireless communication link with a wireless access point. The wireless communication link supports conveyance of communications over multiple data flows between the wireless access point and the mobile communication device. Each data flow can be configured to support conveyance of different types of data. A communication management resource receives feedback indicating network conditions and/or attributes associated with conveyance of the communications over each of the multiple data flows. The communication management resource selectively assigns a compression setting (data flow compression setting) to each of the multiple data flows depending on the feedback. The mobile communication device and/or wireless access point communicate over the data flows in accordance with the received compression settings.

As an example of providing packet delivery data compression, assume that the wireless access point receives a communication including a data payload and respective packet delivery data. The respective packet delivery data can indicate a destination in which to forward the data payload. To provide packet delivery data (header) compression in accordance with data flow compression settings, wireless access point: inspects the respective packet delivery data in the received communication to identify an identity of a data flow to which the received communication pertains; maps the identity of the data flow to corresponding compression settings assigned to the data flow; in accordance with the corresponding data flow compression settings, compresses the packet delivery data into compressed packet delivery data; produces a message to include the compressed packet delivery data and the data payload; and communicates the message over the identified data flow to the mobile communication device.

As another example, assume that the mobile communication device receives a communication including a data payload and respective packet delivery data. The packet delivery data can indicate a destination in which to forward the data payload. In accordance with data flow compression settings assigned to the data flow over which the data packet is being transmitted, the mobile communication device: inspects the packet delivery data in the received communication to identify an identity of a data flow to which the received communication pertains; maps the identity of the data flow to corresponding compression settings assigned to the data flow (as specified by the data flow compression settings); in accordance with the corresponding compression settings, compresses the packet delivery data into compressed packet delivery data; produces a message to include the compressed packet delivery data and the data payload; and communicates the message over the identified data flow to the mobile communication device. (emphasis added)

In this manner, any suitable resource (mobile communication device, wireless access point, gateway resource, etc.) can compress packet delivery data associated with receive communications.

Note further that the communication management resource can be configured to operate in a (packet delivery data) compression mode for any number of reasons. In one embodiment, the communication management resource produces the compression setting information to indicate to compress packet delivery data for communications transmitted over a respective data flow of multiple data flows in the wireless communication link in response to detecting that the respective data flow supports conveyance of a particular type of data (such as video data that requires high amount of data packets over time).

In accordance with further embodiments, the communication management resource produces the compression settings to indicate to compress packet delivery data for communications transmitted over a respective data flow of the wireless communication link to the mobile communication device based on a number of mobile communication devices in wireless communications with the wireless access point. For example, if the bandwidth consumed by a number of communication devices connected to a wireless access point is above a threshold value, embodiments herein can include implementing per data flow packet delivery data (header) compression to save on wireless bandwidth. Thus, whether to apply compression may depend on an amount of wireless bandwidth demanded by corresponding mobile communication devices in a particular region. If the demand is above a threshold value, compression can be applied on a per data flow basis.

In a specific embodiment, the communication device is configured to include a connection manager and/or monitor resource to monitor and detect environmental conditions through network signaling (such as client loading on a wireless access point, wide area network metrics, bit error rates, etc), data flow usage context of the client device. The client device reports the monitored attributes such as performance information (such as key performance indicators) to an upstream network server such as communication management resource. In the case where data flows are assigned to operate in a compression mode, the mobile communication device (client) and wireless access point negotiate to set header compression settings associated with selected traffic data flows based on monitored traffic and/or network conditions. Performing header compression on lossy/high-error wireless interfaces (fewer-than-all data flows) adds processing overhead. However, the communication management resource selectively controls applications of header compression to the selected different data flows (where appropriate), as opposed to applying header compression on every data flow.

Note that any of the resources as discussed herein can include one or more computerized devices, mobile communication devices, servers, base stations, wireless communication equipment, communication management systems, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate wireless channel selection and use. The instructions, when executed by computer processor hardware, cause the computer processor hardware (such as one or more co-located or disparately processor devices) to: establish a wireless communication link between a wireless access point and a mobile communication device; monitor attributes of a network and/or wireless communications conveyed between the wireless access point and the mobile communication device over the wireless communication link; and dynamically implement compression of packet delivery data in the wireless communications transmitted over the wireless communication link depending on the monitored attributes.

Another embodiment herein includes a computer readable storage medium and/or system having instructions stored thereon to facilitate wireless channel selection and use. The instructions, when executed by computer processor hardware, cause the computer processor hardware (such as one or more co-located or disparately processor devices) to: establish a wireless communication link between a wireless access point and a mobile communication device, the wireless communication link supporting conveyance of communications over multiple data flows between the wireless access point and the mobile communication device; monitor a network and/or conveyance of the communications over each of the multiple data flows; and selectively assign compression settings to each of the multiple data flows depending on attributes of the wireless communications conveyed over the data flows.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of supporting different wireless services. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
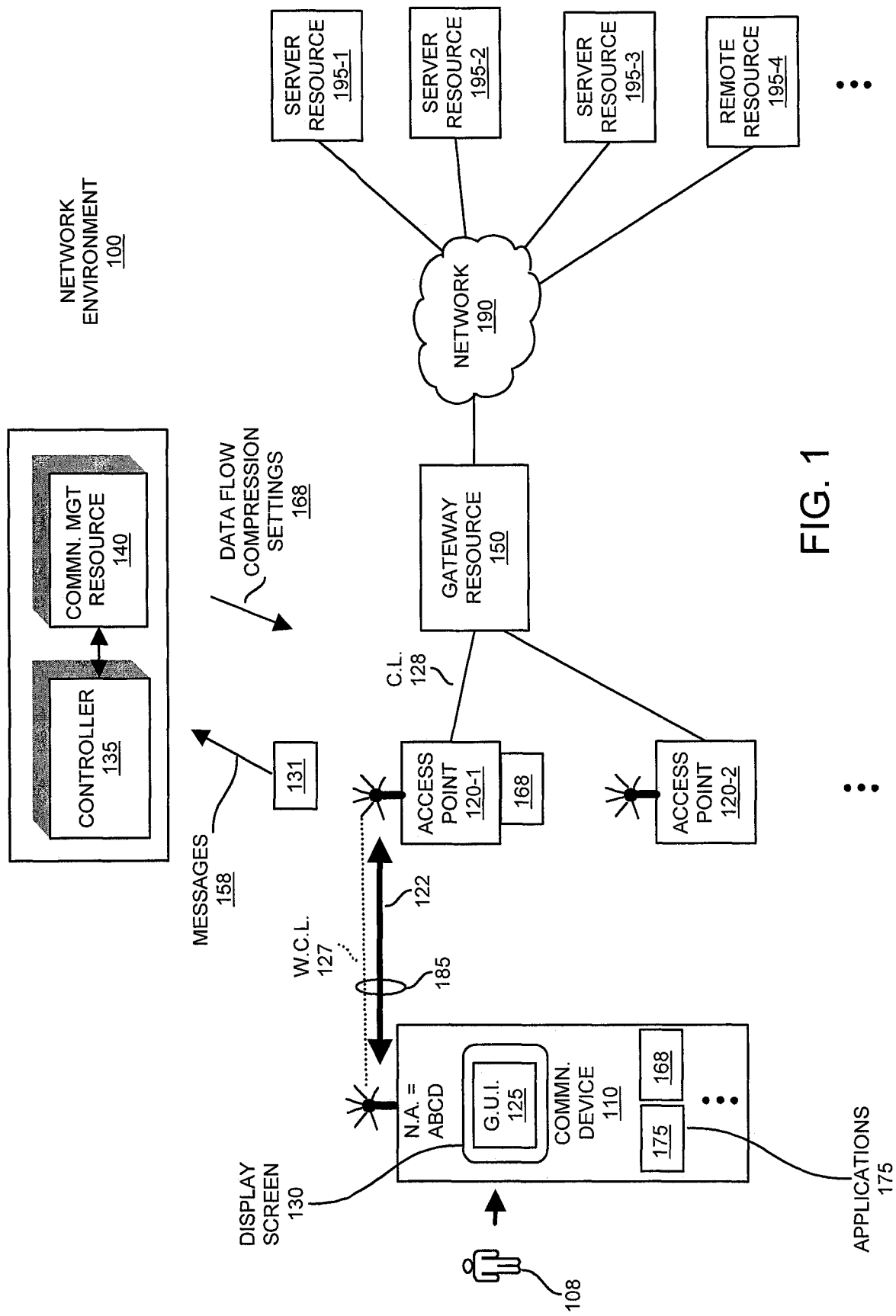
FIG. 1 is an example diagram illustrating a wireless network environment and selective application of header compression according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

As discussed in more detail below, a wireless communication link between a wireless access point and a mobile communication device supports multiple data flows. Each of the data flows can be configured to convey a different type of data. Based on monitoring network conditions and/or conveyance of communications over each of the multiple data flows, a communication management resource selectively assigns (header) compression settings to each of the multiple data flows.

In accordance with the assigned header compression settings, the mobile communication device and/or wireless access point communicate packet delivery data (such as network address information) over the data flows. For example, in accordance with the generated header compression settings, packet delivery data (such as header information) for data packets conveyed over a first data flow are compressed, while packet delivery data (such as header information) for data packets conveyed over a first data flow are not compressed.

In one embodiment, implementing selective compression of packet delivery data (such as header information used to deliver respective data to a recipient) to certain data flows based on end users usage and/or wireless network conditions ensures more efficient use of available wireless bandwidth to support connectivity with mobile communication devices.

Now, more specifically, FIG. 1 is an example diagram illustrating a wireless network environment and dynamic application of header compression settings according to embodiments herein.

As shown, in this example embodiment, network environment 100 includes mobile communication device 110 (hardware, process, software instructions, etc.), wireless access point 120-1 (hardware, process, software instructions, etc.), wireless access point 120-2 (hardware, process, software instructions, etc.), gateway resource 150 (hardware, process, software instructions, etc.), network 190, server resource 195-1, server resource 195-2, server resource 195-3, remote resource 195-4.

Additionally, network environment 100 includes controller 135 (to manage network environment 100) and communication management resource 140 to control conveyance of communications in network environment 100.

In this example embodiment, mobile communication device 110 operated by user 108 executes multiple applications 175. During operation, the user 108 establishes a respective wireless communication link 127 between the mobile communication device 110 and the wireless access point 120-1 to access one or more resources through gateway resource 150 and network 190. Accordingly, the wireless communication link 127 supports communications with one or more remote resources.

As a specific example, via communications over wireless communication link 127, and through the gateway resource 150 and network 190, the applications 175 executing on the communication device 110 communicate with remote resources such as server resource 195-1, server resource 195-2, server resource 195-3, remote resource 194, etc.

Each of the communications 122 conveyed over wireless communication link 127 includes packet delivery data (such as network address information or header information) facilitating delivery of respective communications to the appropriate resource.

In one embodiment, the network environment 100 includes monitor resource 131. Note that monitor resource can reside in any suitable resource such as mobile communication device 110, wireless access point 120-1, gateway resource 150, etc.

During operation, as its name suggests, the monitor resource 131 monitors network conditions and/or attributes of wireless communications 122 conveyed between the wireless access point 120-1 and the mobile communication device 110 over the wireless communication link 127.

Via messages 158, the monitor resource 131 communicates the monitored attributes associated with communications 122 and/or network environment to communication management resource 140. In this manner, in accordance with one embodiments, the communication management resource 140 is constantly updated as to conditions associated with network environment 100 and corresponding communications 122.

Note further that functions associated with the monitor resource 131 can be distributed to multiple different nodes (such as mobile communication device 110, wireless access point 120-1, gateway resource 150, etc.). In such an instance, each of the nodes collects information regarding network conditions and forwards it to the communication management resource 140.

Note that the attributes of network environment 100 monitored by the monitor resource 131 can include any suitable parameter. For example, in one embodiment, the monitored attributes (or feedback) generated by the mobile communication device 110 or other suitable resource can include RF (Radio Frequency) parameters indicating an ability of the mobile communication device to receive wireless communications from the wireless access point to which the mobile communication device is communicatively coupled. The ability of the mobile communication device 110 to receive communications from the wireless access point 120-1 can be used as a factor whether to implement compression on one or more data flows 185.

In accordance with further embodiments, the attributes monitored by monitor resource 131 can be based on any parameter such as: i) a distance between the mobile communication device and the wireless access point, ii) a signal strength of mobile communication device received wireless communications from the wireless access point, iii) a signal to noise ratio of wireless communications received by the mobile communication device from the wireless access point, iv) amount of bandwidth needed to communicate the wireless communications, v) type of conveyed data in the wireless communications, vi) a bit error rate associated with conveyance of the wireless communications, vii) a location of the mobile communication device, viii) amount of total bandwidth used in network environment 100 for a given wireless access point or multiple wireless access points, ix) a mobility state of mobile communication device 110 (such as whether the mobile communication device 110 is a fixed/stationary client connected to a same access point serving the mobile communication device (client) in a high density environment or whether mobile communication device 110 is mobile performing handoffs to different wireless access points).

In a specific embodiment, the monitor resource 131 resides in the mobile communication device 110. In such an instance, the mobile communication device 110 is configured to monitor and detect environmental conditions (such as client loading on a wireless access point, wide area network metrics, bit error rates, etc) through network signaling, usage context of client device, mobility of the mobile communication device 110, etc. The monitor resource 131 reports collected performance information (such as key performance information) in messages 158 to an upstream network server such as communication management resource 140.

In accordance with further embodiments, when header compression is implemented, the mobile communication device 110 (client) and secondary node such as the wireless access point 120-1 negotiate to set header compression settings associated with the traffic data flows based on monitored traffic and/or network conditions. Performing header compression (packet delivery data compression) on different data flows adds processing overhead compared to communicating without compression. However, in contrast to conventional techniques, the communication management resource 140 selectively assigns packet delivery data compression to fewer-than-all data flows where it is most beneficial as opposed to applying header compression on every data flow of the data flows 185 supported by wireless communication link 127.

In accordance with further embodiments, note that the communication management resource 140 (such as controller hardware) dynamically implements compression of packet delivery data in the wireless communications 122 transmitted over the wireless communication link 127 depending on the monitored attributes (as indicated by messages 158) received from monitor resource 131. As further described herein, such an embodiment provides more efficient use of wireless bandwidth because the monitored attributes (as analyzed by communication management resource 140) are sued as a basis to control whether or not to apply packet header compression to different data flows 185.

More specifically, to control compression of packet delivery data (header information supporting delivery of data packets) associated with communications 122 based on the attributes (conditions or events) monitored by monitor resource 131, the communication management resource 140 or other suitable resource generates and communicates data flow compression control settings 168 to one or more target devices such as the wireless access point 120-1, mobile communication device 110, gateway resource 150, etc., to implement compression on appropriate data flows.

For example, one embodiment herein includes communicating first data flow compression settings 168 (such as one or more commands) from the communication management resource 140 (or other suitable resource) over the wireless communication link 127 from the wireless access point 120-1 to the mobile communication device 110. The data flow compression settings 168-1 can indicate to compress packet delivery data embedded in first communications conveyed over a respective first data flow of the established wireless communication link 127. Such a command and data flow compression settings 168 informs the mobile communication device 110 (and compression pairing partner such as the wireless access point 120-1 or gateway resource 150) to support compression of packet delivery data (such as header information) associated with data communicated over the first data flow.

In accordance with still further embodiments, note that the packet delivery data in a respective wireless communication can be generated to include network address information to facilitate delivery of a data packet in the respective wireless communication to a remote destination in a packet delivery network to which the wireless access point is communicably coupled. For example, each respective wireless communication conveyed over the wireless communication link 127 can include a corresponding data packet; the packet delivery data in the corresponding data packet can be generated to include IP (Internet Protocol) network address information indicating a remote destination in which to route the corresponding data packet over through network environment 100. Compression of the packet delivery data for specified data flows (as indicated by the data flow compression settings 168) reduces an amount of bandwidth needed to convey respective data packets.

Figure 2:
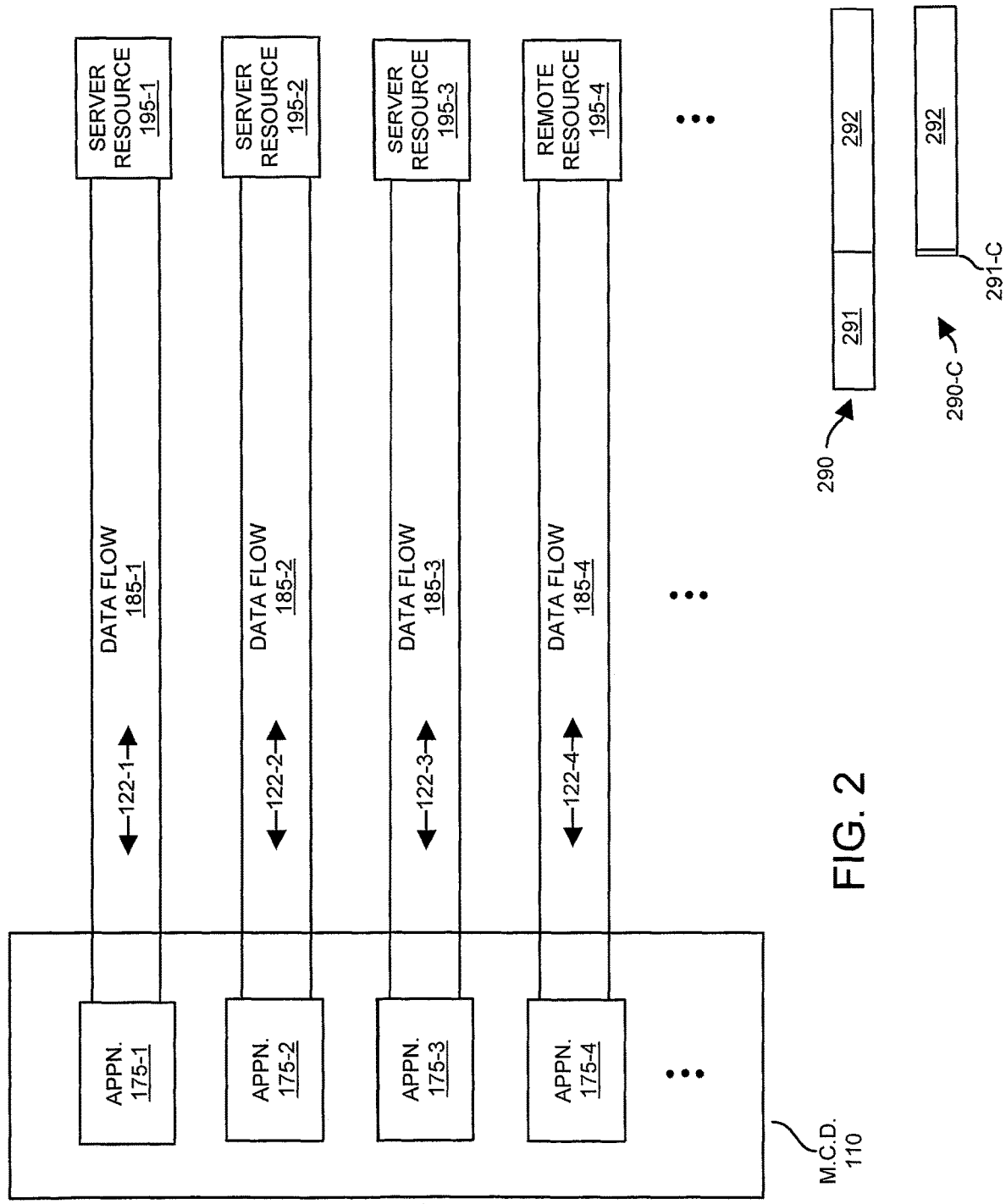
FIG. 2 is an example diagram illustrating multiple data flows supporting communications over a wireless communication link according to embodiments herein.

FIG. 2 is an example diagram illustrating multiple data flows supporting communications over a wireless communication link according to embodiments herein.

As shown, each of the data flows 185 supports conveyance of data between a respective application executing on the mobile communication device 110 and a remote resource such as a server resource or other mobile communication device.

For example, data flow 185-1 supports conveyance of communications 122-1 (data packets) between the application 175-1 executing on the mobile communication device 110 and a remote destination such as server resource 195-1.

Data flow 185-2 supports conveyance of communications 122-2 (data packets) between the application 175-2 executing on the mobile communication device 110 and a remote destination such as the server resource 195-2.

Data flow 185-3 supports conveyance of communications 122-3 (data packets) between the application 175-3 executing on the mobile communication device 110 and a remote destination such as the server resource 195-3.

Data flow 185-4 supports conveyance of communications 122-4 (data packets) between the application 175-4 executing on the mobile communication device 110 and a remote destination such as the resource 195-4 (such as another mobile communication device).

As previously discussed, each of the data flows 185 can be configured to support a different type of communications.

By way of non-limiting example, application 175-1 can be a video browser executed on the communication device 110 to retrieve content such as web-pages from different websites.

Application 175-2 can be an email application executed on the communication device 110 to retrieve email from server resource 195-2.

Application 175-3 can be a media player executed on the mobile communication device 110 to retrieve video content from server resource 195-3.

Application 175-4 can be a voice application executed on the mobile communication device 110 to support voice communications (such as time sensitive data), file transfer data, etc., with a remote resource 195-4 such as a remote mobile communication device.

As previously discussed, the communication management resource 140 can be configured to operate one or more selected data flows 185 in a (packet delivery data) compression mode for any number of reasons.

For example, in one embodiment, the communication management resource 140 produces the data flow compression settings 168 to indicate to compress packet delivery data for communications transmitted over a respective data flow of multiple data flows 185 in the wireless communication link in response to detecting that the respective data flow supports conveyance of a particular type of data (such as video data). Video data typically requires conveyance of many data packets, each of which has similar or same packet delivery data (header information indicating where to deliver the data packet). Compression of the redundant packet delivery data in such packets over a specified data flow reduces the amount of wireless bandwidth needed to convey the video data over the wireless communication link 127 to the multiplication device 110.

In accordance with further embodiments, the communication management resource 140 can be configured to produce the compression settings 168 to indicate to compress packet delivery data for communications transmitted over a respective data flow of the wireless communication link to the mobile communication device based on a number of mobile communication devices (i.e., load) in wireless communications with the wireless access point 120-1. For example, when a high number of clients or bandwidth usage by the client devices over a threshold value share use of wireless access point 120-1, the amount of available bandwidth for each of the clients is reduced. Applying compression to packet delivery data of certain data flows as discussed herein frees up wireless bandwidth for use by the high number of clients. Thus, per data flow compression can be implemented when there are many users above a threshold value. If bandwidth usage is low, the communication management resource 140 can be configured to generate data flow compression settings to indicate no compression on any data flows.

Assume that the data flow 185-1 is assigned to operate in a compression in which the data flow applies compression of respective packet delivery data. In such an instance, when the wireless access point 120-1 receives a communication including a data payload and respective packet delivery data, the wireless access point 120-1 compresses respective packet delivery data of data packets conveyed over the data flow.

For example, in one embodiment, the wireless access point 120-1 inspects a respective packet delivery data in a received communication to identify an identity of a respective data flow to which the received communication pertains. In this example embodiment, assume that the data packet is transmitted over data flow 185-1 to the mobile communication device 110. The wireless access point 120-1 maps the identity of the received communication and data flow to corresponding compression settings assigned to the data flow. In accordance with the corresponding compression settings as specified by the data flow compression settings 168, which indicate that data flow 185-1 is to be operated in a compression mode, the wireless access point 120-1 compresses the packet delivery data into compressed packet delivery data. The wireless access point 120-1 further produces a message to include the compressed packet delivery data and the original data payload and communicates this new message (original payload with compressed packet delivery data) over the identified data flow to the mobile communication device 110.

For messages (data packets) received for data flows in which the data flow compression settings indicate not to compress respective packet delivery data, the respective resource (such as mobile communication device 110, wireless access point 120-1, gateway resource 150, etc.) forwards the data packets without applying compression to the respective packet delivery data.

In a reverse direction, assume that the mobile communication device 110 receives a communication destined for delivery to a target resource in network 190. The received communication includes a data payload and respective packet delivery data. The respective packet delivery data indicates the destination in which to forward the data payload. In response to receiving the communication, the mobile communication device 110 inspects the packet delivery data in the received communication to identify an identity of a data flow to which the received communication pertains. The mobile communication device 110 then maps the identity of the data flow or packet delivery data to corresponding compression settings assigned to the data flow. In accordance with the corresponding compression settings indicating to operate in a compression mode, the mobile communication device 110 compresses the packet delivery data into compressed packet delivery data. The mobile communication device 110 produces a message for the received data packet to include the compressed packet delivery data and the data payload and communicates this new message (original data packet and compressed packet delivery data) over the identified data flow to the mobile communication device.

Thus, when operating in a compression mode, the processing node compresses corresponding header information of a data packet prior to forwarding.

As further shown, the example data packet 290 for conveyance over a data flow is a not yet compressed data packet including packet delivery data 291 and data payload 292. In one embodiment, data packet 292 is data generated by a respective application such as application 175-1 executing on mobile communication device 110.

When compression is applied to a data flow by a respective resource such as mobile communication device 110, the resource compresses the packet delivery data 291 into compressed packet delivery data 291-C to create compressed data packet 290-C (which includes compressed packet delivery data 291-C and original data payload 292). The mobile communication device 110 forwards the compressed data packet 291-Content over data flow 185-1 to the wireless access point 120-1.

A decompressing resource (such as wireless access point 120-1 or gateway resource 150) converts the compressed data packet 290-C into data packet 290 prior to further forwarding of the re-creation of original data packet 290 from the decompressing resource to a destination recipient in network environment 100.

Note that the implementation of compressing data packets conveyed over a data flow can be based on direction. For example, in one embodiment, the data flow compression settings 168 can indicate that communications (data packets) conveyed downstream from a wireless access point 120-1 over data flow 185-1 to the mobile communication device 110 can be compressed in a manner as discussed herein. However, the data flow compression settings 168 can indicate that data packets communicated in an upstream direction over the data flow 185-1 from the mobile communication device 110 are not to be compressed.

In one embodiment, the communication management resource 140 disables compression on data packets in the upstream direction because the amount of data packets is minimal; while the communication management resource 140 enables compression on data packets in the downstream direction because the amount of data packets is substantial.

Figure 3:
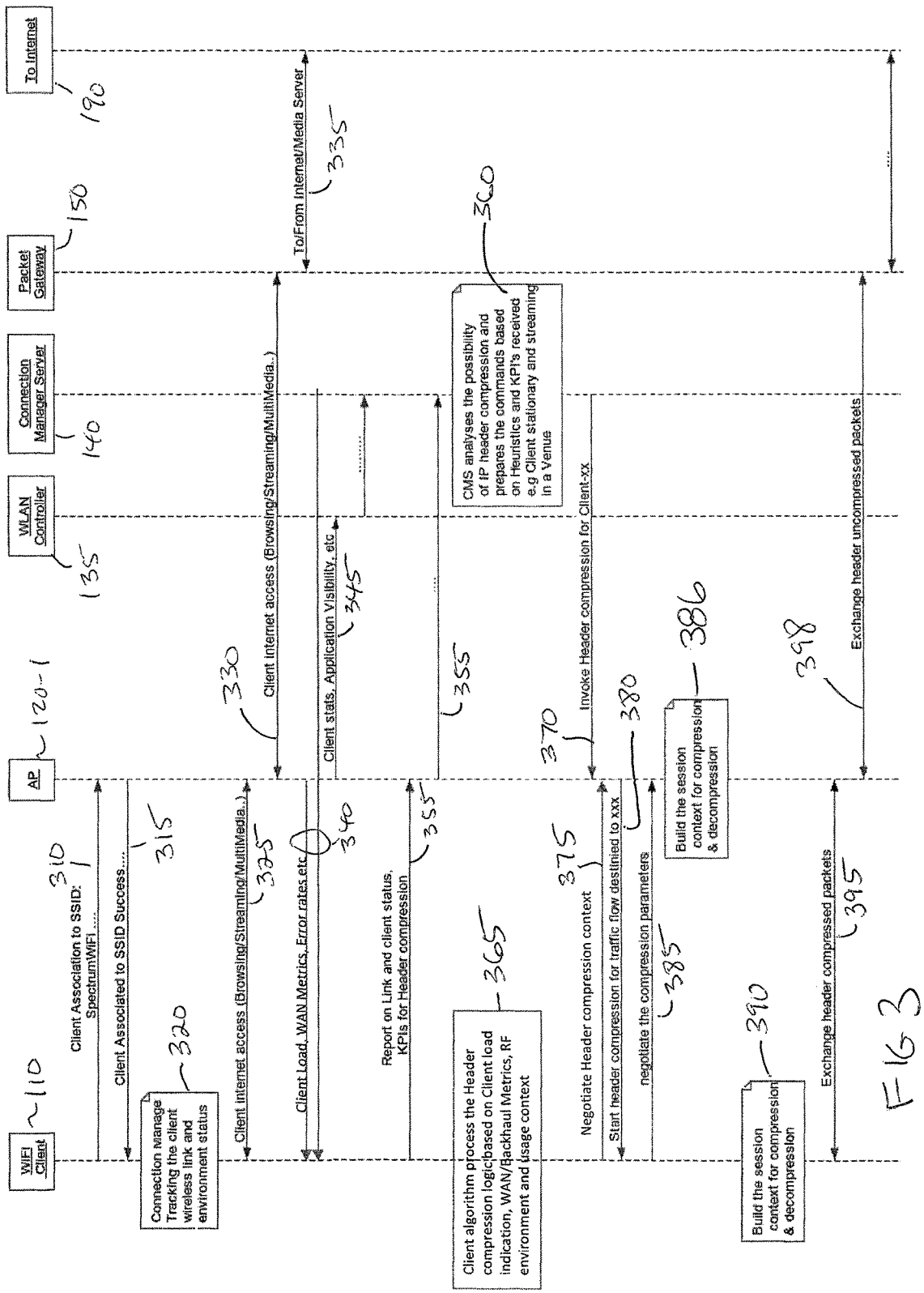
FIG. 3 is an example diagram illustrating a flow of communications to instantiate header compression on different data flows according to embodiments herein.

FIG. 3 is a diagram illustrating an example flow of communications according to embodiments herein.

In this example embodiment, via communications 310 and 315, the mobile communication device 110 establishes a wireless communication link 127 with the wireless access point 120-1.

In processing operation 320, a monitor resource 131 in the mobile communication device 110 is configured to monitor communications associated with wireless communication link 127 and environment status.

Via a combination of communications 325, 330, and 335, the mobile communication device 110 communicates through the wireless access point 120-1 and gateway resource 150 to retrieve content from resources communicatively coupled to network 190.

Via communications 340, the wireless access point and the connection management resource 140 provide notification of client load, wide-area network metrics, areas, etc., associated with network environment 100.

Via communications 345, the wireless access point 120-1 communicates information such as client status information, application visibility, etc., to the controller 135. Controller 135 further communicates such information to the connection management resource 140.

Via communications 355, the monitor resource 131 disposed in the mobile communication device 110 communicates information (such as information as discussed with respect to messages 158) over the wireless communication link 127 and through the wireless access point 120-1 to the connection management resource 140. In one embodiment, the communications 350 and 355 include a report on wireless link status (associated with wireless communication link 127) as well as performance information (key performance metrics) for consideration of header compression.

In processing operation 360, the connection management resource 140 (such as a communication management server) analyzes the feedback received from the monitor resource 131. In one embodiment, the communication management resource analyzes the possibility of applying compression to header information (packet delivery data) associated with one or more data flows established over the wireless communication link 127. Based on feedback such as how much bandwidth is needed to communicate data over each respective data flow and potentially other performance information such as whether the client is stationary and streaming data in a venue, the connection management resource determines which of the multiple data flows 185 supported by the wireless communication link 127 will be operated in a compression mode in which respective packet delivery data is compressed.

In processing operation 365, mobile communication device 110 processes header compression logic based on client load indication, backhaul metrics, RF environment, usage contexts, etc.

Via communications 370 and 375, the connection management resource 140 communicates data flow compression settings 168 to wireless access point 120-1 as well as communication device 110 (assuming that mobile communication device 110 and the wireless access point 120-1 are a compression pairing in this example). The wireless access point 120-1 and mobile communication is 110 negotiate header compression and setup for any data flows that will operate in a respective compression mode as specified by the data flow compression settings 168.

Via communications 380, the wireless access point 120-1 notifies the mobile communication device 110 to start compression of packet delivery data (header information) for appropriate one or more data flows.

Via communications 385, the mobile communication device 110 communicates with the wireless access point 120-1 to negotiate compression settings/parameters.

In processing operation 386, the wireless access point 120-1 builds a session context for compression and decompression of packet delivery data in data packets associated with data flows set to compression mode.

In processing operation 390, the mobile communication device 110 builds a session context for compression and decompression of packet delivery data in data packets associated with data flows set to compression mode.

Via communications 395, the mobile communication device 110 in the wireless access point 120-1 exchange data packets in which respective responding packet delivery data is compressed in accordance with any data flows assigned to operate in a compression mode as indicated by the data flow compression settings 168.

Via communications 398 (communications outside a compression node pairing), the wireless access point 120-1 and/or gateway resource 150 supports the exchange of data packets in which the corresponding packet delivery data is not compressed.

Figure 4:
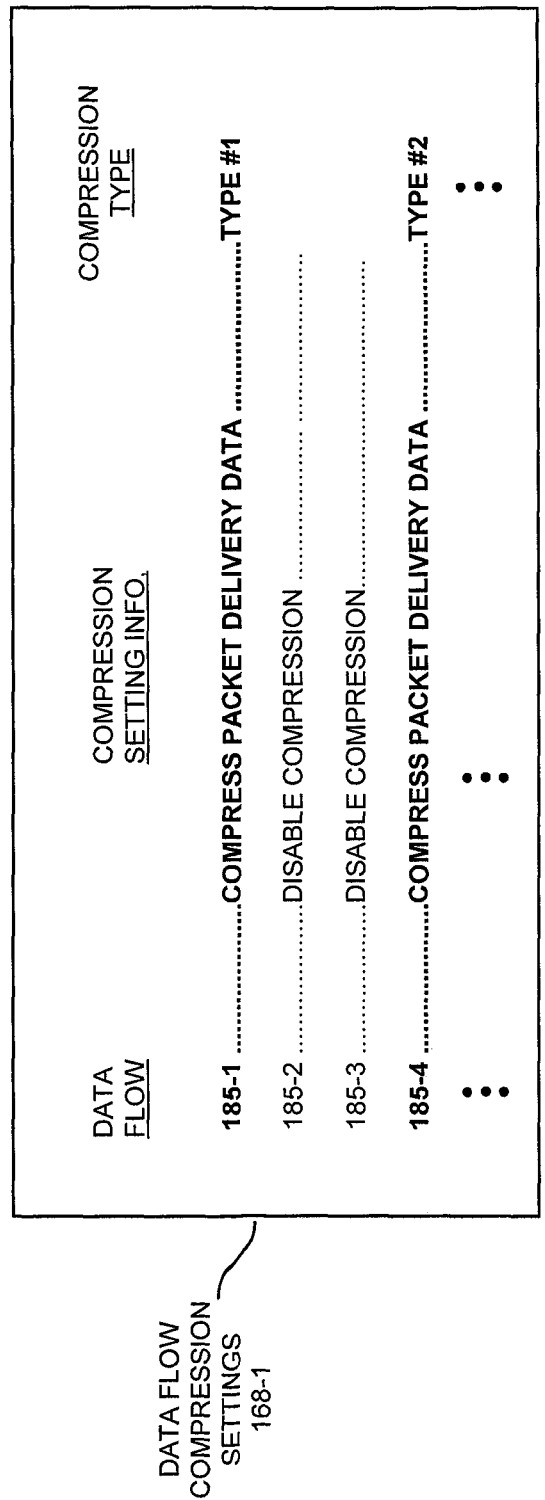
FIG. 4 is an example diagram illustrating dynamic generation of data flow compression settings according to embodiments herein.

FIG. 4 is an example diagram illustrating dynamic generation of compression settings according to embodiments herein.

As shown, based on receipt of messages 158 (feedback of network conditions or communications) from monitor resource 131 including monitored attributes of network environment 100 and corresponding communications 122 associated with mobile communication device 110, the communication management resource 140 generates the data flow compression settings 168-1.

In this example embodiment, the data flow compression settings 160-1 indicate that packet delivery data associated with data flows 185-1 and 185-4 are to be compressed (i.e., compression is enabled). As previously discussed, data flow can be assigned a compression mode in cases where the data flow conveys a large number of communications in which application of compression provides substantial wireless bandwidth savings.

Conversely, data flow compression settings 168-1 indicate that packet delivery data associated with communications over data flows 185-2 and data flow 185-3 are not to be compressed (i.e., compression of packet delivery data is disabled). As previously discussed, data flow can be assigned a non-compression mode in cases where the data flow conveys a small number of communications in which application of compression would not provide much wireless bandwidth savings.

Figure 5:
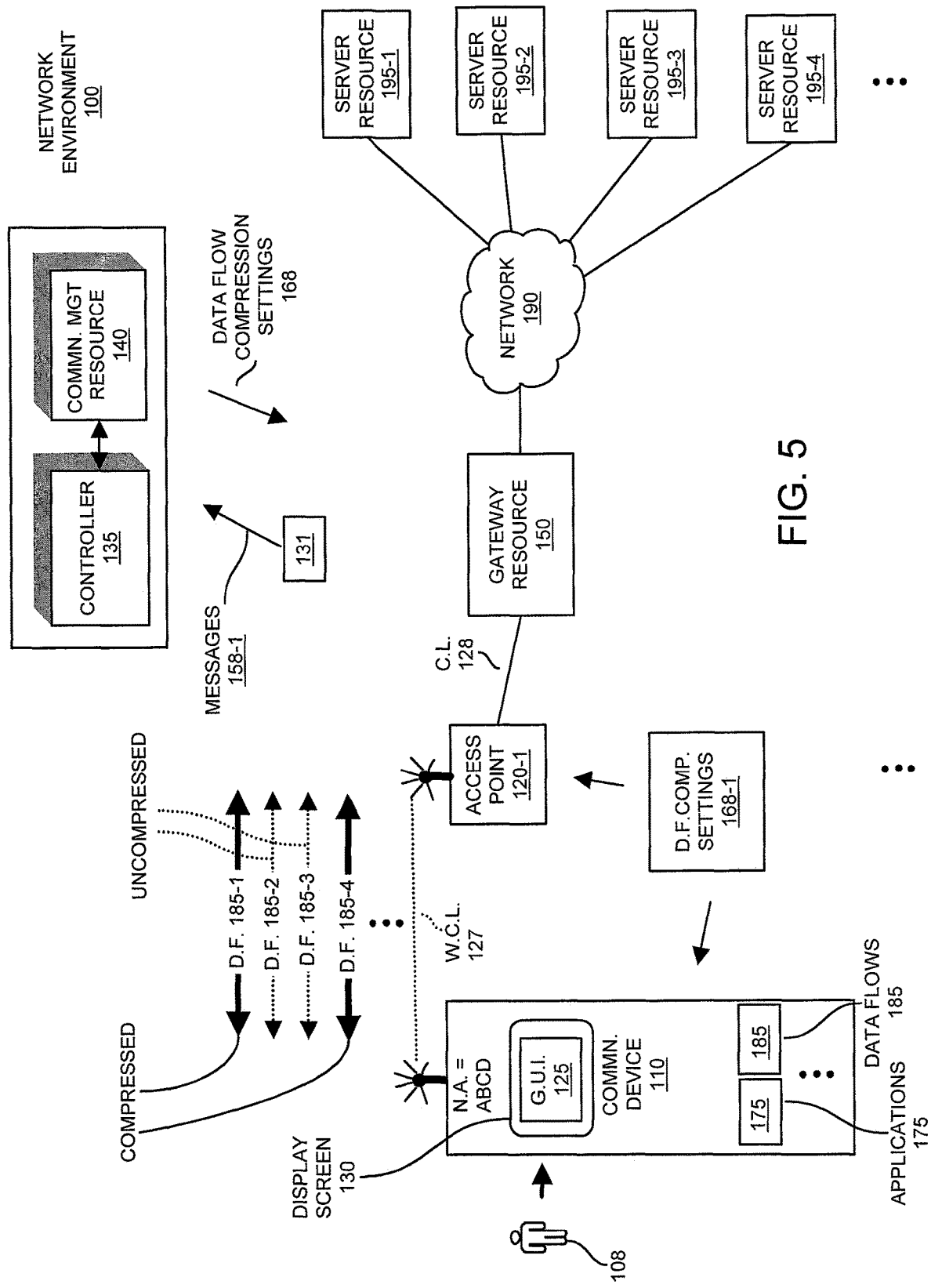
FIG. 5 is an example diagram illustrating application of generated compression settings to multiple data flows according to embodiments herein.

FIG. 5 is an example diagram illustrating application of generated compression settings to multiple data flows according to embodiments herein.

As previously discussed, with reference to current FIG. 5 and other prior FIGS., communication management resource 140 generates data flow compression settings 168-1 based on current network operating conditions as specified by the feedback, status information, status of communicating over data flows, etc., as indicated by messages 158 from one or more resources in network environment 100.

Communication management resource 140 or other suitable resource communicates the data flow compression settings 168-1 to one or more resources such as mobile communication device 110, wireless access point 120-1, gateway resource 150, etc. The pairing of resources receiving the data flow compression settings 168-1 implement compression of packet delivery data in a manner as by the communication management resource 140.

For example, assume that packet delivery data compression is implemented between the mobile communication device 110 and the wireless access point 120-1. Each of the mobile communication device 110 and the wireless access point 120-1 receives notification of the data flow compression settings 168-1 and implements packet delivery data compression for communications over data flows 185-1 and 185-4.

More specifically, during operation, in accordance with the data flow compression settings 168-1, the mobile communication device 110 compresses packet delivery data associated with data packets transmitted from application 175-1 and application 175-4 over each of the respective data flows 185-1 and data flow 185-4 to the wireless access point 120-1. The wireless access point 120-1 un-compresses (or decompresses) the compressed packet delivery data into its original form prior to forwarding the packet delivery data and corresponding communications over communication link 128 through gateway resource 150 to a target recipient in network 190.

Further, as previously discussed in FIG. 2 and current FIG. 5, in accordance with the data flow compression settings 168-1, communications 122-2 and 122-3 transmitted from the mobile communication device 110 over data flows 185-2 and 185-3 of the wireless communication link 127 are transmitted with uncompressed packet delivery data (standard delivery information). In other words, no compression is applied to the communications 122-2 and 122-3 transmitted over data flows 185-2 and 185-3. In such an instance, the wireless access point 120-1 forwards the communications received over data flows 185-2 and 185-3 to destinations as specified by the corresponding packet delivery data.

In a reverse direction, in accordance with the data flow compression settings 168-1, the wireless access point 120-1 compresses packet delivery data associated with communications 122-1 and 122-4 prior to delivering same over respective data flows 185-1 and 185-4 to the mobile communication device 110. Further, in accordance with the data flow compression settings 168-1, wireless access point 120-1 does not apply compression to packet delivery data in corresponding communications 122-2 and 122-3 transmitted over respective data flows 185-2 and 185-3 to the mobile communication device 110.

Note that any pairing of resources can be configured to provide compression of packet delivery data. For example, as previously discussed, the pairing of the mobile communication device 110 and the wireless access point 120-1 can be configured to provide compression of packet delivery data. Alternatively, a combination such as the mobile communication device 110 and the gateway resource 150 can be configured to provide compression of specified data flows.

In this latter instance, the gateway resource 150 performs compression/decompression functions instead of the wireless access point 120-1. Communications 122-1 and 122-4 over data flows 185-1 and 185-4 are compressed; communications 122-2 and 122-3 over data flows 185-2 and 185-3 are not compressed.

Accordingly, implementing compression of header information such as packet delivery data in the wireless network environment 100 can include operating data flows 185-1 and 185-4 in a compression mode while operating data flows 185-2 and 185-3 in a non-compression mode. Thus, a first data flow can be operated to compress packet delivery data associated with first data packets while a second data flow can be operated in a mode in which corresponding packet delivery data associated with second data packets is not compressed.

Figure 6:
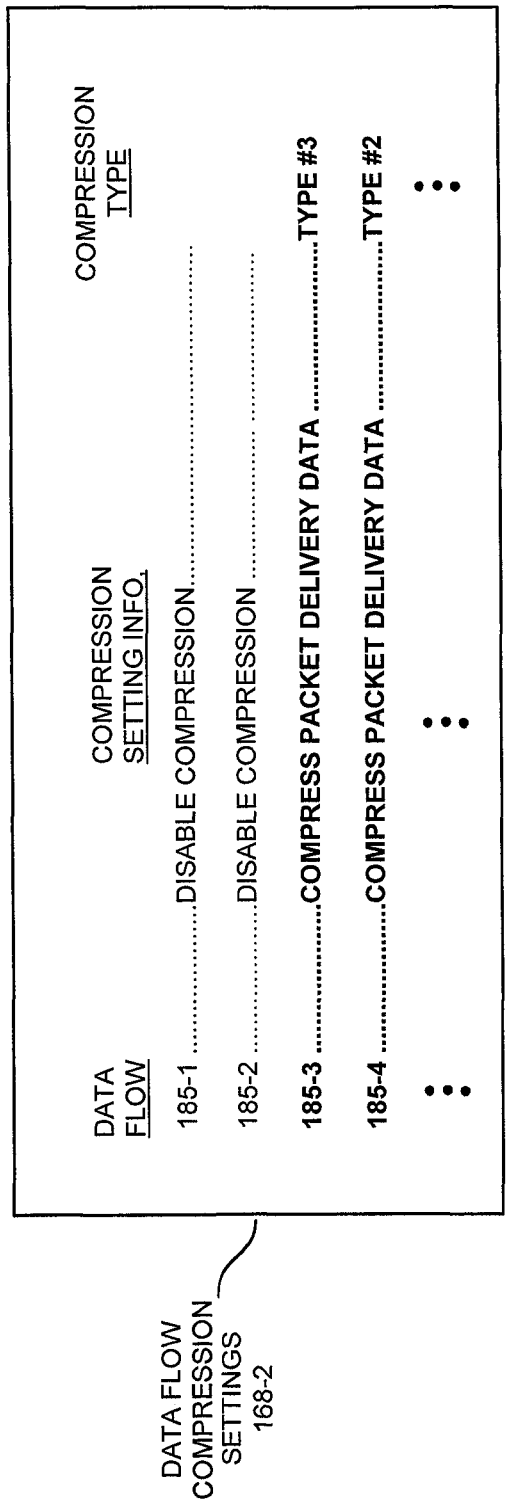
FIG. 6 is an example diagram illustrating dynamic generation of compression settings according to embodiments herein.

FIG. 6 is an example diagram illustrating dynamic generation of compression settings according to embodiments herein.

As shown, based on receipt of constantly updated messages 158-2 (feedback of network conditions or communications) from monitor resource 131 including monitored attributes of network environment 100 and corresponding communications 122 from mobile communication device 110, the communication management resource 140 generates the data flow compression settings 168-2.

In this example embodiment, based on changing network conditions as indicated by the messages 158-2, the data flow compression settings 168-2 (new settings) indicate that packet delivery data associated with data flows 185-3 and 185-4 are to be compressed (i.e., compression is enabled). Conversely, data flow compression settings 168-2 (new settings) indicate that packet delivery data associated with communications over data flows 185-1 and data flow 185-2 are not to be compressed (i.e., compression of packet delivery data is disabled).

Accordingly, in response to detecting a change in network conditions, the communication management resource 140 updates the compression settings for each of the data flows.

Figure 7:
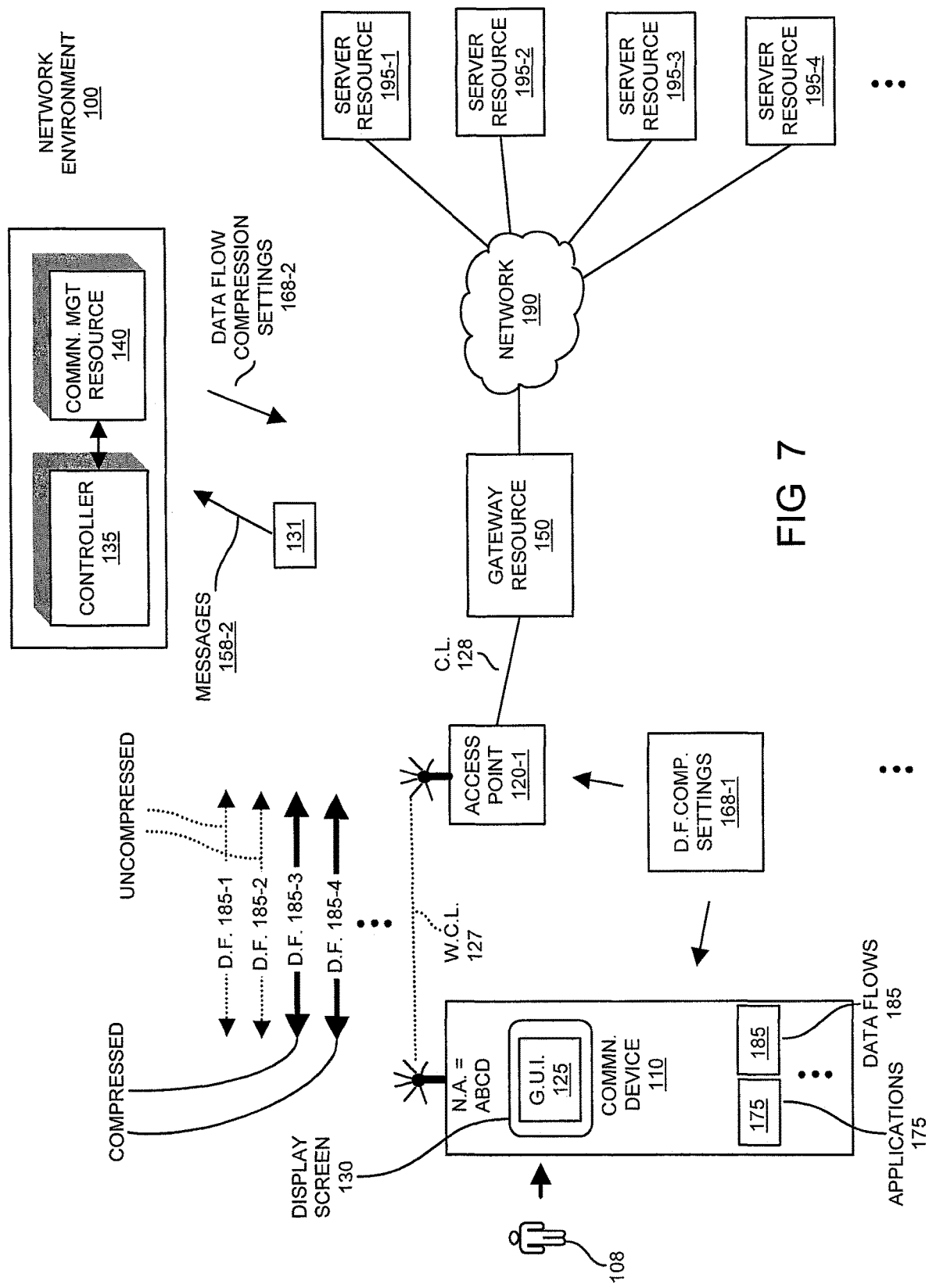
FIG. 7 is an example diagram illustrating application of generated compression settings to multiple data flows according to embodiments herein.

FIG. 7 is an example diagram illustrating application of generated compression settings to multiple data flows according to embodiments herein.

As previously discussed, communication management resource 140 generates data flow compression settings 168-2 based on current network operating conditions as specified by the feedback, status information, etc., in messages 158-2 from one or more resources in network environment 100. Communication management resource 140 or other suitable resource communicates the data flow compression settings 168-2 to one or more resources such as mobile communication device 110, wireless access point 120-1, gateway resource 150, etc. The resources receiving the data flow compression settings 168-2 implement compression of packet delivery data in a manner as by the communication management resource 140.

For example, assume that each of the mobile communication device 110 and the wireless access point 120-1 receives notification of the data flow compression settings 168-2 to provide packet delivery data compression for communications over data flows 185-3 and 185-4 and no compression to data flows 185-1 and 185-2.

In accordance with the data flow compression settings 168-2, the mobile communication device 110 compresses packet delivery data associated with data packets transmitted from application 175-3 and application 175-4 over each of the respective data flows 185-3 and data flow 185-4 to the wireless access point 120-1. The wireless access point 120-1 decompresses the compressed packet delivery data into its original form prior to forwarding the packet delivery data and corresponding communications over communication link 128 through gateway resource 150 to a target recipient in network 190.

Further, in accordance with the data flow compression settings 168-2, communications 122-1 and 122-2 transmitted from the mobile communication device 110 over data flows 185-1 and 185-1 of the wireless communication link 127 are transmitted with uncompressed packet delivery data (standard delivery information). The wireless access point 120-1 forwards the communications received over data flows 185-1 and 185-2 to destinations as specified by the corresponding packet delivery data without performing compression operations.

In a reverse direction, in accordance with the data flow compression settings 168-2, the wireless access point 120-1 compresses packet delivery data associated with communications 122-3 and 122-4 prior to delivering same over respective data flows 185-3 and 185-4 to the mobile communication device 110. Further, in accordance with the data flow compression settings 168-2, wireless access point 120-1 does not apply compression to packet delivery data in corresponding communications 122-1 and 122-2 transmitted over respective data flows 185-1 and 185-2 to the mobile communication device 110.

As previously discussed, any pairing of resources can be configured to provide compression of packet delivery data. For example, as previously discussed, the mobile communication device 110 and the wireless access point 120-1 can be configured to provide compression of packet delivery data. Alternatively, a combination such as the mobile communication device 110 and the gateway resource 150 can be configured to provide header compression of specified data flows. In such an instance, the gateway resource 150 performs compression/decompression functions instead of the wireless access point 120-1.

Example Savings of Applying Compression Per Data Flow

Assume that the mobile communication device 110 streams video over data flow 185-4 (which has been assigned compression) using the RTP protocol for a duration=60 minutes.

The RTP (Real-Time Transport) protocol uses the UDP (User Datagram Protocol) as transport protocol and IPv4 as networking protocol.

The total downloaded Packets=4 Million packets for the entire 60 minute duration.

Assume that each packet contains a header (packet delivery data)=40 bytes. Thus, total Header (packet delivery data) bytes for the duration=4×40×8=1280 Megabits is the header overhead (packet delivery data information).

For data flow 185-4, with RTP/UDP/IP header compression applied to such client data transfer: 40 bytes of header information is compressed to a per packet compressed header of 1 byte.

Total Duration Header overhead reduced to=4×1×8=32 Megabits. The compression gain=97.5%. That means, for the data flow 185-4 in which compression is applied, a respective portion of wireless bandwidth is freed and made available for transmitting another 1248 Megabits (1.2 Gigabytes), probably enough to serve another client with better user experience on background traffic in a high density environment.

Another data flow such as data flow 185-2 for the same 60-minute duration may convey only 4K data packets. As previously discussed, the data flow compression settings 168-1 indicate not to apply compression. In one embodiment, compression is not applied for data packets over data flow 185-2 because the savings would be only around 1.28 Megabytes, substantially less than 1.248 Gigabytes for data flow 185-4.

Figure 8:
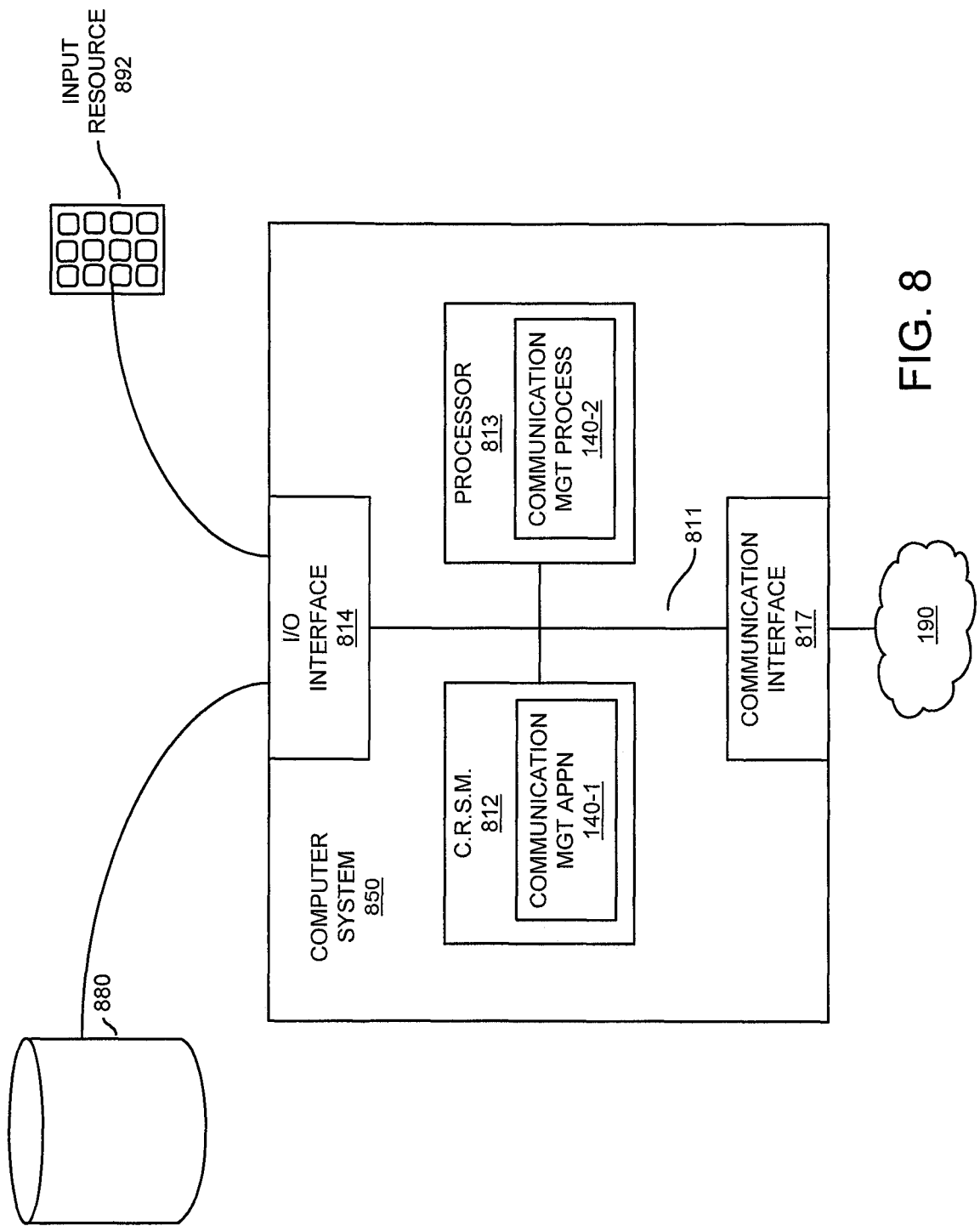
FIG. 8 is an example diagram illustrating example computer architecture operable to execute one or more operations according to embodiments herein.

FIG. 8 is an example block diagram of a computer system for implementing any of the operations as previously discussed according to embodiments herein.

Any of the resources (such as controller 135, communication management resource 140, monitor resource 131, mobile communication device 110, wireless access point 120-1, etc.) as discussed herein can be configured to include computer processor hardware, analog/digital circuitry, and/or corresponding executable instructions to carry out the different operations as discussed herein.

As shown, computer system 850 of the present example includes an interconnect 811 that couples computer readable storage media 812 such as a non-transitory type of media (i.e., any type of hardware storage medium) in which digital information can be stored and retrieved, a processor 813, I/O interface 814, and a communications interface 817.

I/O interface(s) 814 supports connectivity to repository 880 and input resource 892.

Computer readable storage medium 812 can be any hardware storage device such as memory, optical storage, hard drive, floppy disk, etc. In one embodiment, the computer readable storage medium 812 stores instructions and/or data.

As shown, computer readable storage media 812 can be encoded with management application 140-1 (e.g., including instructions) to carry out any of the operations as discussed herein.

During operation of one embodiment, processor 813 accesses computer readable storage media 812 via the use of interconnect 811 in order to launch, run, execute, interpret or otherwise perform the instructions in management application 140-1 stored on computer readable storage medium 812. Execution of the management application 140-1 produces management process 140-2 to carry out any of the operations and/or processes as discussed herein.

Those skilled in the art will understand that the computer system 850 can include other processes and/or software and hardware components, such as an operating system that controls allocation and use of hardware resources to management application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 850 may reside at any location or can be included in any suitable resource in any network environment to implement functionality as discussed herein.

Functionality supported by the different resources will now be discussed via flowcharts in FIGS. 9 and 10. Note that the steps in the flowcharts below can be executed in any suitable order.

Figure 9:
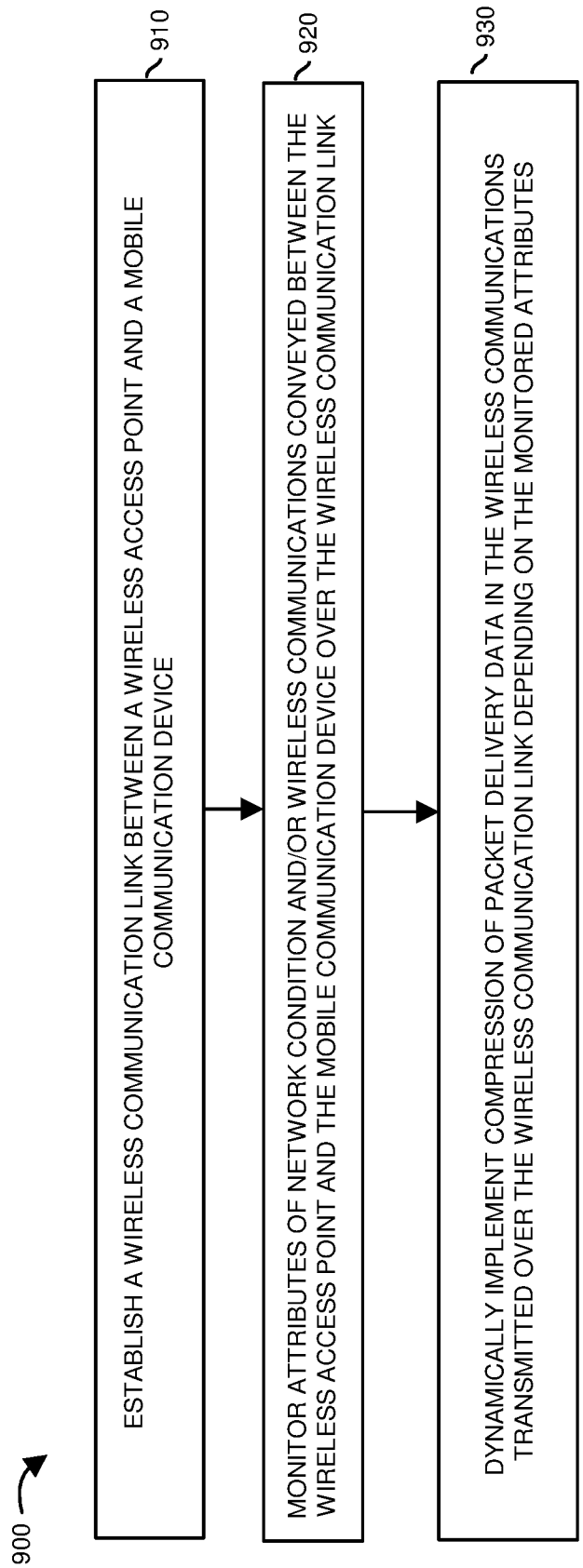
FIGS. 9 and 10 are example diagrams illustrating methods according to embodiments herein.

FIG. 9 is a flowchart 900 illustrating an example method according to embodiments herein. Note that there will be some overlap with respect to concepts as discussed above.

In processing operation 910, the user 108 establishes a wireless communication link 127 between a mobile communication device 110 and wireless access point 120-1.

In processing operation 920, monitor resource 130 monitors attributes network conditions and/or wireless communications conveyed between the wireless access point 120-1 and the mobile communication device 110 over the wireless communication link 127.

In processing operation 930, the communication management resource 140 dynamically implements, via data flow compression settings 168, compression of packet delivery data in the wireless communications 122 transmitted over the wireless communication link 127 depending on the monitored attributes (such as indicated by the messages 158).

Figure 10:
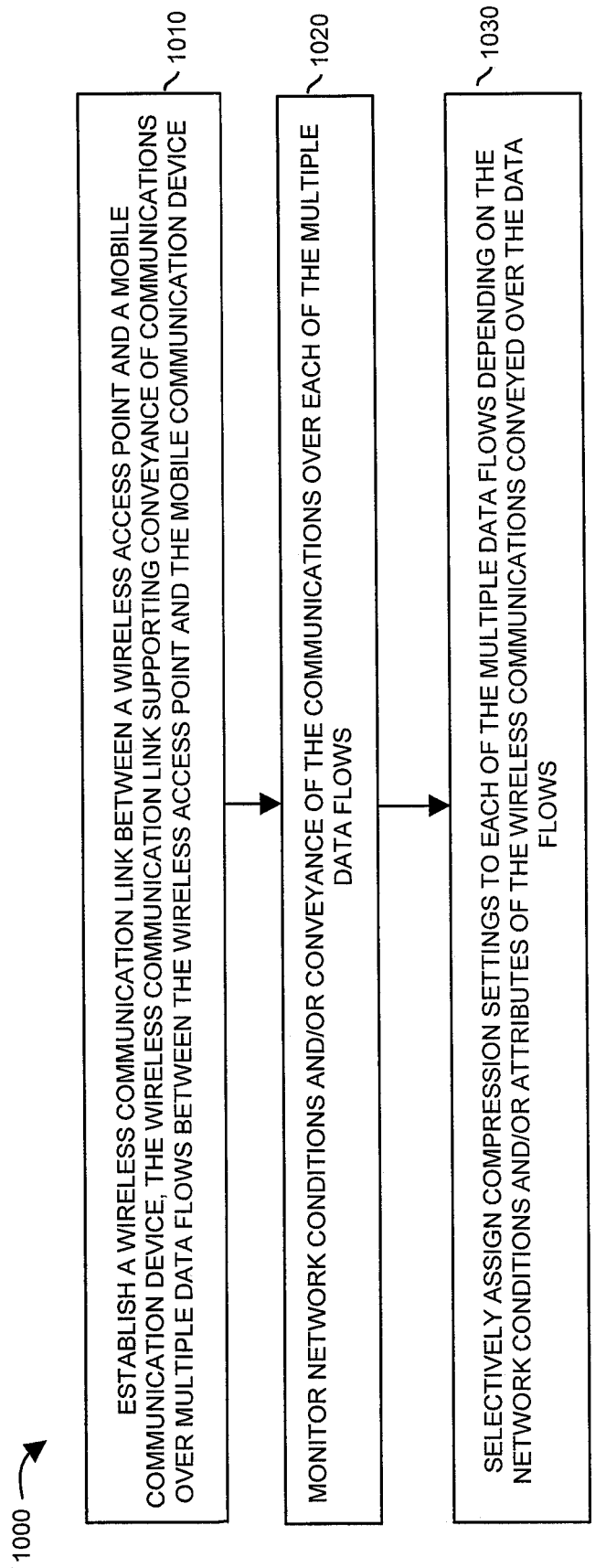

FIG. 10 is a flowchart 1000 illustrating an example method according to embodiments herein. Note that there will be some overlap with respect to concepts as discussed above.

In processing operation 1010, the user 108 establishes a wireless communication link 127 between the mobile communication device 110 and wireless access point 120-1. The wireless communication link 127 supports conveyance of communications over multiple data flows 185 between the wireless access point 120-1 and the mobile communication device 110.

In processing operation 1020, the monitor resource 131 monitors network conditions and/or conveyance of the communications over each of the multiple data flows 185.

In processing operation 1030, the communication management resource 140 selectively assigns compression settings 168 to each of the multiple data flows 185 depending on detected attributes of the network conditions and/or wireless communications 122 conveyed over the data flows 185.

Note again that techniques herein are well suited to facilitate improved use of bandwidth available in a wireless network. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
    establishing a wireless communication link between a wireless access point and a first mobile communication device in a network environment, the first mobile communication device being one of multiple mobile communication devices in communication with the wireless access point, the wireless access point providing the multiple mobile communication devices access to a remote network;
    monitoring wireless bandwidth consumption of wireless data conveyed between the wireless access point and the multiple mobile communication devices in the network environment; and
    dynamically implementing compression of packet delivery data in wireless communications transmitted over the wireless communication link depending on the monitored wireless bandwidth consumption;
    wherein the wireless communications include first wireless communications and second wireless communications, the first wireless communications transmitted over a first data flow of the wireless communication link, the second wireless communications transmitted over a second data flow of the wireless communication link; and
    wherein dynamically implementing the compression of packet delivery data in the wireless communications transmitted over the wireless communication link includes: in response to detecting that the mobile communication device is stationary in the network environment: i) disabling compression of packet delivery data in the first wireless communications communicated over the first data flow, and ii) disabling compression of packet deliver data in the second wireless communications communicated over the second data flow.

2. The method as in claim 1, wherein the wireless bandwidth consumption indicates an ability of the first mobile communication device to receive the wireless communications from the wireless access point.

3. The method as in claim 1, wherein the packet delivery data in a respective wireless communication communicated between the first mobile communication device and the wireless access point includes network address information facilitating delivery of a corresponding data packet in the respective wireless communication to a remote destination in a packet delivery network to which the wireless access point is communicably coupled.

4. The method as in claim 1, wherein the wireless communication link supports multiple different data flows including the first data flow and the second data flow between the wireless access point and the first mobile communication device;
wherein monitoring attributes associated with conveyance of the wireless communications and dynamically implementing compression includes: selecting the first data flow in which to implement compression of packet delivery data of wireless messages transmitted over the selected first data flow.

5. The method as in claim 4, wherein dynamically implementing compression of packet delivery data in the wireless communications transmitted over the wireless communication link depending on the monitored wireless bandwidth consumption includes:
communicating compressed packet delivery data in the wireless messages conveyed over the first data flow of the wireless communication link; and
communicating uncompressed packet delivery data in wireless messages conveyed over the second data flow of the wireless communication link.

6. The method as in claim 1 further comprising:
communicating data flow compression settings over the wireless communication link from the wireless access point to the first mobile communication device, the data flow compression settings indicating to compress packet delivery data embedded in the first communications conveyed over the first data flow, the data flow compression settings indicating to convey second communications over the second data flow without compressing corresponding packet delivery data.

7. The method as in claim 1,
wherein dynamically implementing the compression of the packet delivery data includes: compressing packet delivery data in wireless communications transmitted over the first data flow and disabling compression of packet delivery data in wireless communications transmitted over the second data flow.

8. The method as in claim 1 further comprising:
dynamically implementing the compression of the packet delivery data in the wireless communications transmitted over the wireless communication link depending on a mobility status of the first mobile communication device.

9. The method as in claim 1 further comprising:
dynamically implementing the compression of packet delivery data in the wireless communications transmitted over the wireless communication link depending on the first mobile communication device performing handoffs with different wireless access points in the network environment.

10. The method as in claim 1 further comprising:
dynamically implementing the compression of the packet delivery data in the wireless communications transmitted over the wireless communication link depending on an amount of bandwidth needed to communicate the wireless communications.

11. The method as in claim 1 further comprising:
dynamically implementing the compression of the packet delivery data in the wireless communications transmitted over the wireless communication link depending on a direction in which the wireless communications are transmitted over the wireless communication link.

12. The method as in claim 1, wherein first wireless communications are transmitted over the wireless communication link in an upstream direction from the first mobile communication device to the wireless access point, the second wireless communications transmitted in a downstream direction over the wireless communication link from the wireless access point to the first mobile communication device; and
wherein dynamically implementing the compression of packet delivery data in the wireless communications transmitted over the wireless communication link includes: i) disabling compression of packet delivery data in the first wireless communications communicated in the upstream direction from the first mobile communication device to the wireless access point; and ii) compressing packet delivery data in the second wireless communications communicated in the downstream direction from the wireless access point to the first mobile communication device.

13. The method as in claim 1, wherein the wireless bandwidth represents an amount of wireless bandwidth demanded by the multiple mobile communication devices to communicate with the wireless access point, which is disposed in a particular region.

14. The method as in claim 1, wherein dynamically implementing compression of the packet delivery data in the wireless communications transmitted over the wireless communication link includes:
communicating compression control information to the wireless access point and the first mobile communication device.

15. The method as in claim 14, wherein data flow compression settings notify the first mobile communication device of a corresponding pairing partner that supports decompression of the packet delivery data, the corresponding pairing partner being a communication gateway resource providing connectivity to the remote network.

16. The method as in claim 1, wherein dynamically implementing compression of the packet delivery data in wireless communications transmitted over the wireless communication link includes:
implementing the compression based on a performance of communicating over the wireless communication link.

17. The method as in claim 1, wherein dynamically implementing compression of the packet delivery data in wireless communications transmitted over the wireless communication link includes:
implementing the compression in response to detecting that the first mobile communication device is stationary and retrieving data over the wireless communication link.

18. The method as in claim 1, wherein dynamically implementing the compression of packet delivery data in the wireless communications transmitted over the wireless communication link includes:
in response to detecting that the first mobile communication device is stationary in the network environment: disabling compression of the packet delivery data included in the wireless communications.

19. The method as in claim 1 further comprising:
communicating data flow compression settings over the wireless communication link from the wireless access point to the first mobile communication device, the data flow compression settings indicating to compress the packet delivery data.

20. The method as in claim 1 further comprising:
dynamically implementing compression of first packet delivery data for the first data flow communicated over the wireless communication link based on an amount of data packets communicated over the first data flow of the wireless communication link.

21. The method as in claim 1, wherein the first wireless communications are transmitted over the wireless communication link in an upstream direction from the first mobile communication device to the wireless access point, the second wireless communications transmitted in a downstream direction over the wireless communication link from the wireless access point to the first mobile communication device; and
wherein dynamically implementing the compression of packet delivery data in the wireless communications transmitted over the wireless communication link includes: i) based on a magnitude of data packets in the first wireless communications, disabling compression of packet delivery data in the first wireless communications communicated in the upstream direction from the first mobile communication device to the wireless access point; and ii) based on a magnitude of data packets in the second wireless communications, compressing packet delivery data in the second wireless communications communicated in the downstream direction from the wireless access point to the first mobile communication device.

22. Computer-readable storage hardware having instructions stored thereon, the instructions, when carried out by computer processor hardware, cause the computer processor hardware to:
establish a wireless communication link between a wireless access point and a first mobile communication device in a network environment, the first mobile communication device being one of multiple mobile communication devices in communication with the wireless access point;
monitor wireless bandwidth consumption of wireless data conveyed between the wireless access point and the multiple mobile communication devices in the network environment; and
dynamically implement compression of packet delivery data in the wireless communications transmitted over the wireless communication link depending on a magnitude of the monitored wireless bandwidth consumption;
wherein the wireless communications include first wireless communications and second wireless communications, the first wireless communications transmitted over a first data flow of the wireless communication link, the second wireless communications transmitted over a second data flow of the wireless communication link; and
wherein dynamic implementation of the compression of packet delivery data in the wireless communications transmitted over the wireless communication link includes: in response to detecting that the mobile communication device is stationery in the network environment: i) disable compression of packet deliver data in the first wireless communications communicated over the first data flow, and ii) disable compression of packet delivery data in the second wireless communications communicated over the second data flow.

23. A method comprising:
establishing a wireless communication link between a wireless access point and a mobile communication device in a network environment, the wireless communication link supporting conveyance of communications over multiple data flows between the wireless access point and the mobile communication device;
receiving feedback associated with the mobile communication device, the feedback indicating a mobility status of the mobile communication device; and
selectively assigning compression settings to each of the multiple data flows depending on the mobility status of the mobile communication device as indicated by the feedback;
wherein the wireless communications include first wireless communications and second wireless communications, the first wireless communications transmitted over a first data flow of the wireless communication link, the second wireless communications transmitted over a second data flow of the wireless communication link; and
the method further comprising: dynamically implementing the compression of packet delivery data in the wireless communications transmitted over the wireless communication link, including: in response to detecting that the mobile communication device is stationary in the network environment based on the feedback: i) disabling compression of packet delivery data in the first wireless communications communicated over the first data flow, and ii) disabling compression of packet delivery data in the second wireless communications communicated over the second data flow.

24. The method as in claim 23 further comprising:
at the wireless access point:
receiving a communication, the received communication including a data payload and respective packet delivery data, the respective packet delivery data indicating a destination in which to forward the data payload;
inspecting the respective packet delivery data in the received communication to identify an identity of a data flow to which the received communication pertains;
mapping the identity of the data flow to corresponding compression settings assigned to the data flow;
in accordance with the corresponding compression settings, compressing the packet delivery data into compressed packet delivery data;
producing a message to include the compressed packet delivery data and the data payload; and
communicating the message over the identified data flow to the mobile communication device.

25. The method as in claim 23 further comprising:
at the mobile communication device:
receiving a communication, the received communication including a data payload and respective packet delivery data, the respective packet delivery data indicating a destination in which to forward the data payload;
inspecting the packet delivery data in the received communication to identify an identity of a data flow to which the received communication pertains;
mapping the identity of the data flow to corresponding compression settings assigned to the data flow;
in accordance with the corresponding compression settings, compressing the packet delivery data into compressed packet delivery data;

producing a message to include the compressed packet delivery data and the data payload; and communicating the message over the identified data flow to a wireless access point.

26. The method as in claim 23 further comprising:
producing data flow compression settings, the data flow compression settings indicating to compress packet delivery data for communications transmitted over a respective data flow of multiple data flows in the wireless communication link in response to detecting that the respective data flow supports conveyance of a particular type of data.

27. The method as in claim 23 further comprising:
producing data flow compression settings indicating to compress packet delivery data for communications transmitted over a respective data flow of the wireless communication link to the mobile communication device based on a number of mobile communication devices in wireless communications with the wireless access point.

* * * * *

UNITED STATES PATENT AND TRADEMARK OFFICE
CERTIFICATE OF CORRECTION

| | | |
|---|---|---|
| PATENT NO. | : 11,432,187 B2 | |
| APPLICATION NO. | : 15/945146 | |
| DATED | : August 30, 2022 | |
| INVENTOR(S) | : Ahmed Bencheikh and Venkata R. Divvi | |

It is certified that error appears in the above-identified patent and that said Letters Patent is hereby corrected as shown below:

In the Claims

Column 20, Line 58, replace "deliver", with --delivery--

Column 23, Line 61, replace "stationery", with --stationary--

Column 23, Line 62, replace "deliver", with --delivery--

Signed and Sealed this
Twenty-fifth Day of October, 2022

*Katherine Kelly Vidal*

Katherine Kelly Vidal
*Director of the United States Patent and Trademark Office*